Feb. 16, 1971
J. F. GAZZO
3,564,497
VEHICLE SIGNALLING SYSTEM
Filed Aug. 6, 1968
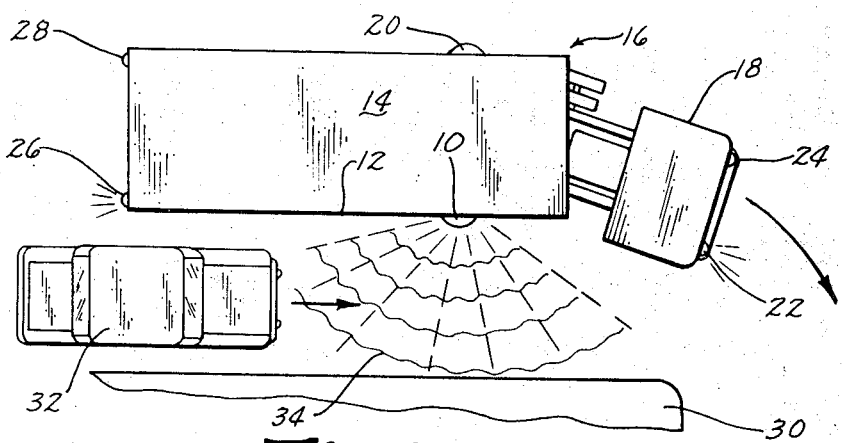
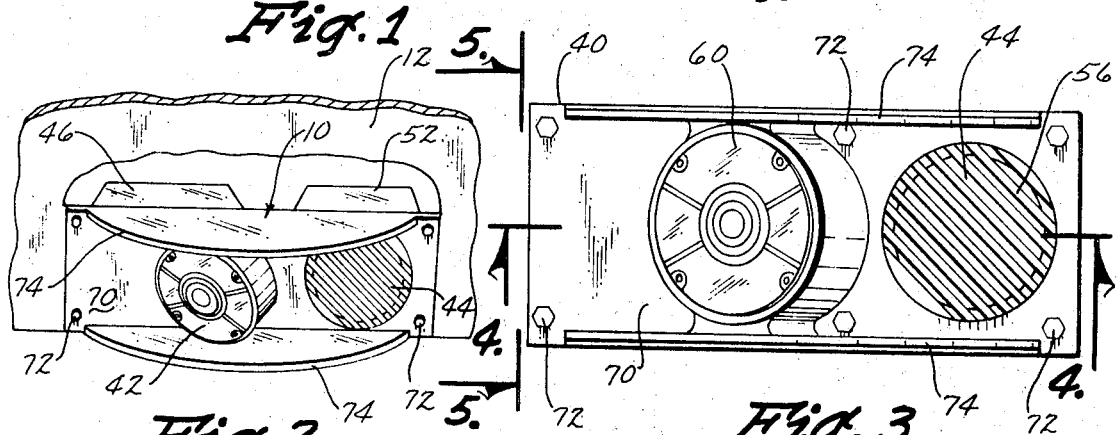
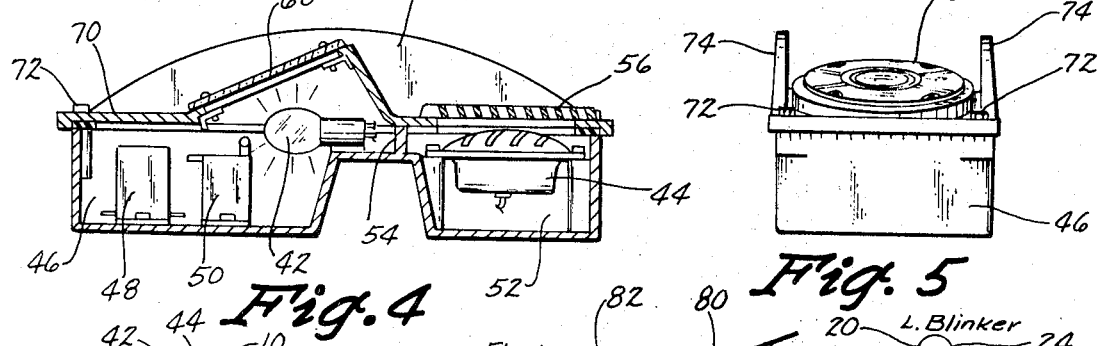
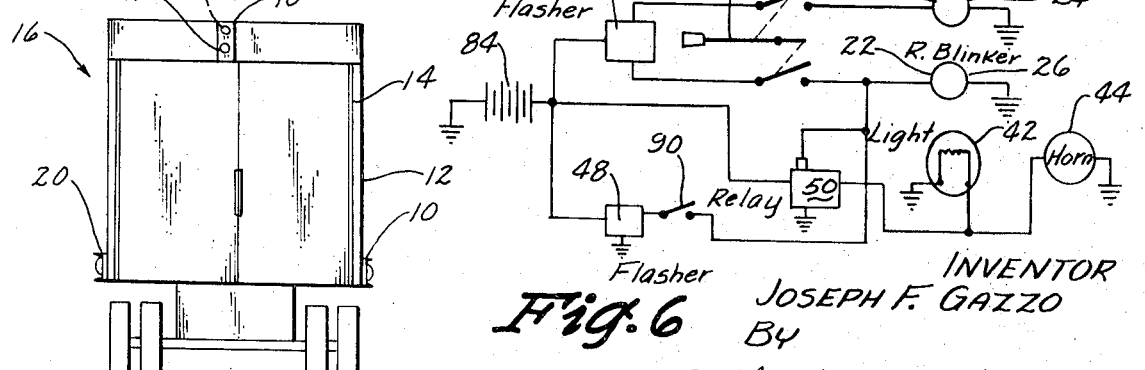
INVENTOR
JOSEPH F. GAZZO
BY
Zarley, McKee & Thomte
ATTORNEYS ›United States Patent Office 3,564,497
Patented Feb. 16, 1971

3,564,497
VEHICLE SIGNALLING SYSTEM
Joseph F. Gazzo, 1303 McKinley Ave.,
Des Moines, Iowa 50315
Filed Aug. 6, 1968, Ser. No. 750,617
Int. Cl. B60g 1/38, 5/00
U.S. Cl. 340—75         4 Claims

ABSTRACT OF THE DISCLOSURE

A device for signalling motorists and pedestrians by use of audio and visual signals directed directly at them that a vehicle is moving or is changing its direction. The signalling device is a localized message center positioned on the vehicle such as a semitruck at the point where danger exists thus alerting people to keep away. An important location for the signalling unit is on the right side of the trailer of a semitruck, to signal those in an area along the truck that cannot see the front and back truck turn signals and cannot be seen by the truckdriver.

---

The streets and highways in most cities and states were not designed for use by semitrailer trucks and this presents a particularly dangerous problem at intersections where the semitrucks make turns especially to the right. If the turn is made in the inside right lane then the trailer will override the curb and sidewalk endangering pedestrians. If the turn is made from the second lane then the trailer will pass over into the first lane in front of, onto or over pedestrians on crosswalks and vehicles in the inside lane. The vehicles in the inside lane are caught in what is called a "squeeze play" as the semitrailer truck makes the right-hand turn. The vehicle is in "no man's land" where the driver of the vehicle cannot see the front and rear turn signals on the semitrailer truck and the truckdriver cannot see the automobile since his cab is turned and his rear view mirror on the right side is out of alignment to see to the rear on the right side.

The same problem of not having sufficient warning for motorists and pedestrians is present with trucks and other vehicles to a greater or lesser extent when backing up is involved. Some trucks move so slowly particularly on soft ground that workmen or the like with their backs to the truck or other vehicle will not be aware that the vehicle is about to run over them.

The vehicle signalling system of this invention provides an unmistakable signal to the motorist or pedestrian that he should stay back and away from the truck to keep clear from a dangerous situation.

The signalling system is enclosed in a unitary housing adapted to be mounted in the sidewall of the trucktrailer with the light and horn in close side-by-side relationship. A protective top and bottom horizontally extending guard protects the light and horn from damage. The light is directed at an angle toward the rear and outwardly such that it shines right in the center of the danger area when the truck is making a right-hand turn. Similarly, when the light is mounted on the rear top of a trailer it will shine downwardly and to the rear into the danger area when the truck is moving rearwardly.

The horn and light each have high amperage requirements and thus cannot be operated off of the electrical wiring conventionally used for right- and left-turn signals. The right- and left-turn signalling circuits are integrated into the circuit of the signalling system of this invention by using the current of the turn signalling circuit to activate a relay which places the signalling light and horn in direct contact through a flasher with the vehicle battery. The signalling light and horn may also be manually operated independently of the conventional right- and left-hand turn signals. The flasher unit causes the horn and light to intermittently flash the warning visual and audible signals.

These and other features and advantages of this invention will become readily apparent to those skilled in the art upon reference to the following description when taken into consideration with the accompanying drawings, wherein:

FIG. 1 is a top plan view of a typical dangerous driving situation involving a semitrailer truck making a right-hand turn while an automobile is in the right-hand lane;

FIG. 2 is a fragmentary perspective view of the unitary signalling system on the side of a trailer of a semitrailer truck;

FIG. 3 is a side elevation view of the signalling light and horn unit only;

FIG. 4 is a cross-sectional view taken along line 4—4 in FIG. 3;

FIG. 5 is an end view taken along line 5—5 in FIG. 3;

FIG. 6 is a schematic of the electrical wiring integrated the horn and light signalling system into the conventional turn signal circuitry; and FIG. 7 is a rear end view of a semitrailer truck employing the horn and light signalling units on both right and left sides and at the rear top of the truck trailer.

The signalling system of this invention is referred to generally in FIG. 1 by the reference numeral 10 and is shown on the right side 12 of the trailer 14 of a semitrailer truck 16 having a cab 18. Optionally, a signalling unit 20 is provided on the left-hand side of the truck opposite the signalling unit 10. The conventional turn signal lights 22 and 24 at the front and 26 and 28 at the rear are provided.

As illustrated in FIG. 1 the semitrailer truck 16 is turning from the second lane at a corner 30 while an automobile 32 is in the inside lane partially alongside the trailer 14 and just about to enter the danger area indicated by the lines of sight and sound 34 emanating from the signalling unit 10. This area 34 is the "no man's land" where the truckdriver in the left hand side of the cab 18 cannot see the vehicle 32 through his conventional rearview mirror system since the cab is turned at an angle to the trailer and the driver of the automobile 32 cannot see the front right-turn signal 22 or the rear right turn signal 26 and thus is not aware of the intention of the truckdriver to turn right except for the substantial light and sound blast emanating from the signalling unit 10 on the side of the trailer 14. This will cause the driver of the car 32 to slow up and permit the truck to make the right-hand turn and thereby avoid being crushed by the truck as the truck moves into the inside lane during the course of turning. The circuitry of FIG. 6 as indicated in FIG. 1 causes the light and horn unit 10 to be activated when the right-hand turn signals 22 and 26 are activated.

The signalling system 10 includes a unitary housing 40 for enclosing the light 42 and the horn 44. The housing is in two parts and includes a base unit having a compartment 46 for the light 42 and a flasher 48 and a relay 50. The second compartment 52 is sealed by a wall 54 from the first compartment 46 and encloses the horn 44 which has a grill 56 over the face of it. A lens 60 is disposed at an angle to the front and back planes of the housing 40 to direct the light rearwardly when mounted on the side of a trailer 12 as seen in FIG. 1 or at the top of the rear end of the trailer 14 as seen in FIG. 7. The compartment 46 having the electrical components and the light 42 are moisture-sealed from the relatively open horn compartment 52. These two compartments 46 and 52 are closed by a top cover plate 70 which is secured by bolts 72 to the bottom pair of compartments. The top plate 70 also includes protective side rails or guards 74 convex outwardly in shape which extend outwardly beyond the outermost point on the lens 60 of the light 42 as seen in FIGS. 4 and 5 thus affording protection to both the light 42 and the horn 52. The convex in shape guards 74 also are decorative in appearance to give the unitary structure a streamline look on the side of the trailer.

The schematic in FIG. 6 illustrates the wiring circuitry for the vehicle signalling system 10 and the conventional turn signalling circuitry on the truck. A turn signalling switch 80 is provided for manually closing a circuit through a flasher 82 connecting the vehicle battery 84 to the turn signals 22, 26 and 20, 24 for the right and left blinkers, respectively. Simultaneously, on activation of the right-turn signals the relay 50 of the light and horn signalling system is activated to connect the light 42 and the horn 44 directly with the battery 84. The signal to the light 42 and the horn 44 is intermittent as the relay is intermittently energized by the conventional vehicle flasher 82. At other times, such as when the vehicle is backed up the light 42 and horn 44 may be intermittently activated by closing the switch 90 which makes a circuit through the flasher 48 with the battery 84 and thus again energizes the relay 50 for connecting the light 42 and horn 44 directly with the battery 84. The wiring on the conventional truck is ordinarily not heavy enough to carry the amperage required to operate the light 42 and the horn 44 and thus the relay 50 prevents the overloading of the turn signal circuitry by operating the light and horn through separate heavier wiring.

Thus it is seen that through use of the signalling system of this invention the important warning message which is both audible and visible is presented to the pedestrian and the motorist at the danger area thereby giving them plenty of notice to stay away from the truck or if in the danger area to move out as quickly as possible before the truck completes its right-hand turn and causes damage and injury to persons and vehicles nearby. This system when properly used may give complete and clear warning to all that might possibly be endangered by the semitrailer truck. While the driver of the truck being in the left-hand side of the cab can normally see to the left when turning left it may be nevertheless desirable to use a signalling unit 10 on the left-hand side as seen in FIG. 7. Certainly, it is desirable to use the signalling unit 10 at the rear of the truck since the entire area behind the truck is not always visible to the driver through conventional rearview mirror systems. It is also apparent that the signalling system to be completely effective must provide both audible and visual warnings since the motorist or the pedestrian may not be able to hear where he can see or conversely cannot see whereas he might be able to hear. It is accordingly apparent that the vehicle signalling system of this invention provides the solution to the vexing problem facing safety experts for years involving trucks making right-hand turns when they cannot see motorists or pedestrains who cannot known that the truck is making the turn.

I claim:

1. A motor vehicle having a unitary signalling unit comprising an audible signalling means and a visible signalling means, said audible and visible signalling means being in close side-by-side proximity to each other to provide a localized signalling message center, said signalling unit being located on said vehicle in a position to be exposed to the exterior of said vehicle for indicating movement of said vehicle in the direction said unit is facing, said vehicle being a truck trailer and said signalling unit is located on the right side of the trailer intermediate the ends thereof, and said audible means being a horn and said visible means being a light of sufficient intensity to be heard and seen from at least any point along the right side of said trailer, said light including a housing positioned to direct a substantial amount of the light outwardly and rearwardly relative to the longitudinal axis of the trailer to direct a signal to the zone adjacent the rear and to the right thereof, said horn and light unit being in an electrical circuit coupled with the right turn signals of the vehicle for operation simultaneously therewith, said vehicle electrical system including an electrical power source for said right-turn signals, a relay being connected between said light and horn unit and said turn signals and said power source such that said turn signals are adapted to activate said relay to close a direct circuit between said power source and said horn and light unit.

2. The structure of claim 1 wherein said horn and light are included in a second circuit adapted to be selectively operated independently of said vehicle right turn signals.

3. The structure of claim 1 wherein said signalling unit includes a housing having two chambers, one of said chambers being for said light and said relay and being sealed from said other chamber containing said horn and from exterior to maintain said first chamber moisture free.

4. The structure of claim 1 wherein said audible and visual signalling means are further defined as a horn and a light respectively, said light and horn are arranged along the longitudinal axis of said unit and have a pair of guard members extending outwardly on opposite longitudinal sides of said light and horn, and said guard members being convex outwardly in shape and extending outwardly further than the outermost point on said light or horn to minimize contact from the exterior with said horn and light.

References Cited

UNITED STATES PATENTS

| 1,374,944 | 4/1921 | Mulvehill | 340—75 |
| 1,656,821 | 1/1928 | Hanson | 340—111 |
| 2,203,502 | 6/1940 | Michel | 340—76 |
| 2,294,049 | 8/1942 | Renshaw | 340—75X |
| 2,562,274 | 7/1951 | Hollins | 340—81(F) |
| 2,671,212 | 3/1954 | Mingle | 340—88 |
| 2,700,726 | 1/1955 | Bassler | 240—8.2 |
| 2,775,751 | 12/1956 | Gordon et al. | 340—70 |
| 2,908,808 | 10/1959 | Kester et al. | 240—8.2 |

FOREIGN PATENTS

| 423,120 | 1/1935 | Great Britain | 340—70 |
| 880,706 | 6/1953 | Germany | 340—70 |
| 961,516 | 4/1957 | Germany | 340—81 |
| 316,328 | 4/1934 | Italy | 340—70 |

DONALD J. YUSKO, Primary Examiner

K. N. LEIMER, Assistant Examiner

U.S. Cl. X.R.

340—66, 70, 81